United States Patent
Lee et al.

(10) Patent No.: US 11,343,847 B2
(45) Date of Patent: May 24, 2022

(54) METHOD FOR TRANSMITTING OR RECEIVING SIGNAL IN WIRELESS COMMUNICATION SYSTEM AND DEVICE THEREFOR

(71) Applicant: LG ELECTRONICS INC., Seoul (KR)

(72) Inventors: Sangrim Lee, Seoul (KR); Hojae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 342 days.

(21) Appl. No.: 16/488,498

(22) PCT Filed: Feb. 6, 2018

(86) PCT No.: PCT/KR2018/001534
§ 371 (c)(1),
(2) Date: Aug. 23, 2019

(87) PCT Pub. No.: WO2018/155841
PCT Pub. Date: Aug. 30, 2018

(65) Prior Publication Data
US 2020/0008236 A1   Jan. 2, 2020

Related U.S. Application Data

(60) Provisional application No. 62/462,792, filed on Feb. 23, 2017.

(51) Int. Cl.
| | |
|---|---|
| *H04W 74/00* | (2009.01) |
| *H04W 4/70* | (2018.01) |
| *H04W 52/32* | (2009.01) |
| *H04W 72/08* | (2009.01) |
| *H04W 74/08* | (2009.01) |
| *H04W 88/06* | (2009.01) |

(52) U.S. Cl.
CPC .......... *H04W 74/004* (2013.01); *H04W 4/70* (2018.02); *H04W 52/325* (2013.01);
(Continued)

(58) Field of Classification Search
None
See application file for complete search history.

(56) References Cited

U.S. PATENT DOCUMENTS

| 2017/0279472 | A1* | 9/2017 | Wong ................. H04B 1/06 |
| 2018/0191413 | A1* | 7/2018 | Suzuki ............... H04L 5/0053 |
| 2019/0327639 | A1* | 10/2019 | Huang ................ H04L 1/188 |

FOREIGN PATENT DOCUMENTS

| KR | 100855225 | 8/2008 |
| KR | 1020130028942 | 3/2013 |

(Continued)

OTHER PUBLICATIONS

European Patent Office Application Serial No. 18756679.9, Search Report dated Nov. 20, 2020, 11 pages.

(Continued)

*Primary Examiner* — Shripal K Khajuria
(74) *Attorney, Agent, or Firm* — Lee Hong Degerman Kang & Waimey

(57) ABSTRACT

A method for a user equipment (UE) to transmit an uplink signal in a wireless communication system according to an embodiment of the present invention includes the steps of: determining a data transmission mode; and transmitting to a base station through a competition resource region, a control channel carrying control information including the data transmission mode, a data channel carrying at least one transmission block (TB), and a preamble, wherein the preamble indicates the position of a resource to which the control channel is mapped in the competition resource region, and the data transmission mode determined by the UE can correspond to one among a first transmission mode in which 1 TB is transmitted by being divided into N sub-blocks or a second transmission mode in which 1 TB is repeatedly transmitted M times. The UE is capable of (Continued)

communicating with at least one of another UE, a UE related to an autonomous driving vehicle, the base station or a network.

13 Claims, 11 Drawing Sheets

(52) U.S. Cl.
CPC ..... *H04W 72/085* (2013.01); *H04W 74/0866* (2013.01); *H04W 88/06* (2013.01)

(56) References Cited

FOREIGN PATENT DOCUMENTS

| KR | 101481052 | 1/2015 |
|---|---|---|
| WO | 2005057822 | 6/2005 |
| WO | 2010098532 | 9/2010 |

OTHER PUBLICATIONS

Intel Corporation, "Grant-free UL transmissions in NR," 3GPP TSG-RAN WG1 #86bis, R1-1609499, Oct. 2016, 8 pages.
Nokia Networks, "Convolution versus Turbo Coding for PUSCH Bundling," 3GPP TSG-RAN WG1 Meeting#82, R1-153842, Aug. 2015, 2 pages.
PCT International Application No. PCT/KR2018/001534, Written Opinion of the International Searching Authority dated May 28, 2018, 18 pages.
3rd Generation Partnership Project (3GPP), "Technical Specification Group Radio Access Network; Evolved Universal Terrestrial Radio Access (E-UTRA); Medium Access Control (MAC) protocol specification (Release 14)," 3GPP TS 36.321 V14.1.0, Dec. 2016, 98 pages.

* cited by examiner

METHOD FOR TRANSMITTING OR RECEIVING SIGNAL IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2018/001534, filed on Feb. 6, 2018, which claims the benefit of U.S. Provisional Application No. 62/462,792, filed on Feb. 23, 2017, the contents of which are all hereby incorporated by reference herein in their entirety.

TECHNICAL FIELD

The present disclosure relates to a wireless communication system, and more particularly, to a method of transmitting or receiving a signal in a contention-based manner and device therefor.

BACKGROUND ART

As a number of communication devices have required much higher communication capacity, scenarios for the next generation communication system (e.g., 5G or new RAT) have been discussed in recent years. For example, Enhanced Mobile Broadband (eMBB), Ultra-reliable Machine-Type Communications (uMTC), and Massive Machine-Type Communications (mMTC) are included in the scenarios. The eMBB corresponds to a next generation mobile communication scenario characterized by high spectrum efficiency, high user experienced data rates, high peak data rates, etc. The uMTC corresponds to a next generation mobile communication scenario characterized by ultra-high reliability, ultra-low latency, ultra-high availability, etc. For example, the uMTC may include V2X, emergency services, remote control, etc. The mMTC corresponds to a next generation mobile communication scenario characterized by low cost, low energy, short packets, massive connectivity, etc. For example, the mMTC may include Internet of Things (IoT).

FIG. 1 illustrates relation between core performance requirements for 5G, which are proposed in IMT 2020, and 5G performance requirements for each service scenario. In particular, uMTC services have extremely restricted Over-The-Air (OTA) latency requirements and requires high mobility and reliability (e.g., OTA Latency<1 ms, Mobility>500 km/h, and BLER<10-6).

For the next generation wireless communication, new Radio Access Technology (RAT) considering the eMBB, mMTC, URLCC, etc. has been discussed.

DISCLOSURE

Technical Problem

The object of the present disclosure is to provide a method capable of performing contention-based signal transmission and reception accurately and efficiently and device therefor.

It is to be understood that both the foregoing general description and the following detailed description of the present disclosure are exemplary and explanatory and are intended to provide further explanation of the disclosure as claimed.

Technical Solution

In an aspect of the present disclosure, provided herein is a method of transmitting an uplink signal by a user equipment (UE) in a wireless communication system. The method may include: determining a data transmission mode; and transmitting, to a base station, a control channel carrying control information including the data transmission mode, a data channel carrying at least one transport block (TB), and a preamble in a contention resource region. The preamble may indicate the location of a resource to which the control channel is mapped within the contention resource region. The data transmission mode determined by the UE may correspond to either a first transmission mode where one TB is divided into N sub-blocks and then transmitted or a second transmission mode where the one TB is repeatedly transmitted M times.

In another aspect of the present disclosure, provided herein is a UE for transmitting an uplink signal in a wireless communication system. The UE may include: a processor configured to determine a data transmission mode; and a transmitter configured to transmit, to a base station, a control channel carrying control information including the data transmission mode, a data channel carrying at least one TB, and a preamble in a contention resource region under control of the processor. The preamble may indicate the location of a resource to which the control channel is mapped within the contention resource region. The data transmission mode determined by the UE may correspond to either a first transmission mode where one TB is divided into N sub-blocks and then transmitted or a second transmission mode where the one TB is repeatedly transmitted M times.

In still another aspect of the present disclosure, provided herein is a method of receiving an uplink signal by a base station in a wireless communication system. The method may include: detecting a preamble; receiving a control channel transmitted by a UE on a resource in a control resource region, wherein the resource is indicated by the preamble; and receiving a data channel carrying at least one TB based on control information carried by the control channel. The control information may indicate a data transmission mode applied to the data channel carrying the at least one TB. The data transmission mode may correspond to either a first transmission mode where one TB is divided into N sub-blocks and then transmitted or a second transmission mode where the one TB is repeatedly transmitted M times.

In a further aspect of the present disclosure, provided herein is a base station for receiving an uplink signal in a wireless communication system. The base station may include a processor; and a receiver configured to detect a preamble, receive a control channel transmitted by a UE on a resource in a control resource region, wherein the resource is indicated by the preamble, and receive a data channel carrying at least one TB based on control information carried by the control channel under control of the processor. The control information may indicate a data transmission mode applied to the data channel carrying the at least one TB. The data transmission mode may correspond to either a first transmission mode where one TB is divided into N sub-blocks and then transmitted or a second transmission mode where the one TB is repeatedly transmitted M times.

When the data transmission mode corresponds to the second transmission mode, the control information may further include a redundancy version pattern for the M-times repeated transmission.

The control information may further include information on the size of each of the at least one TB and a parameter for UE-specific scrambling applied to the at least one TB.

Different channel coding schemes and different block error ratios (BLERs) may be applied to the control and data channels.

The UE may determine the data transmission mode based on a result obtained by measuring a reference signal received from the base station. When the result obtained by measuring the reference signal is equal to or greater than a threshold, the first transmission mode may be selected. When the result obtained by measuring the reference signal is smaller than the threshold, the second transmission mode may be selected.

The UE may determine the data transmission mode based on power headroom. When the power headroom is equal to or greater than a threshold, the first transmission mode may be selected. When the power headroom is smaller than the threshold, the second transmission mode may be selected.

The UE may determine the data transmission mode based on the maximum number of times of transmission allowed in the contention resource region.

Advantageous Effects

According to the present disclosure, information on a data transmission mode can be transmitted in uplink control information, thereby performing contention-based signal transmission and reception more accurately and efficiently.

It will be appreciated by persons skilled in the art that that the effects that could be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the present disclosure, and are incorporated in and constitute a part of this specification, illustrate embodiments of the disclosure and together with the description serve to explain the principles of the disclosure.

BEST MODE

The following description of embodiments of the present disclosure may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. 3GPP LTE adopts OFDMA in downlink and adopts SC-FDMA in uplink. LTE-A (LTE-Advanced) is an evolved version of 3GPP LTE.

For clarity, the following description mainly concerns 3GPP based mobile communication system, by which the technical idea of the present disclosure may be non-limited. Specific terminologies used in the following description are provided to help understand the present disclosure and the use of the terminologies can be modified to a different form within a scope of the technical idea of the present disclosure.

Prior to discussion of the New RAT, the 3GPP LTE/LTE-A system will briefly be described. The following description of 3GPP LTE/LTE-A may be referenced to help understanding of New RAT, and some LTE/LTE-A operations and configurations that do not conflict with the design of New RAT may also be applied to New RAT. New RAT may be referred to as 5G mobile communication for convenience.

3GPP LTE/LTE-A System

Figure 1:
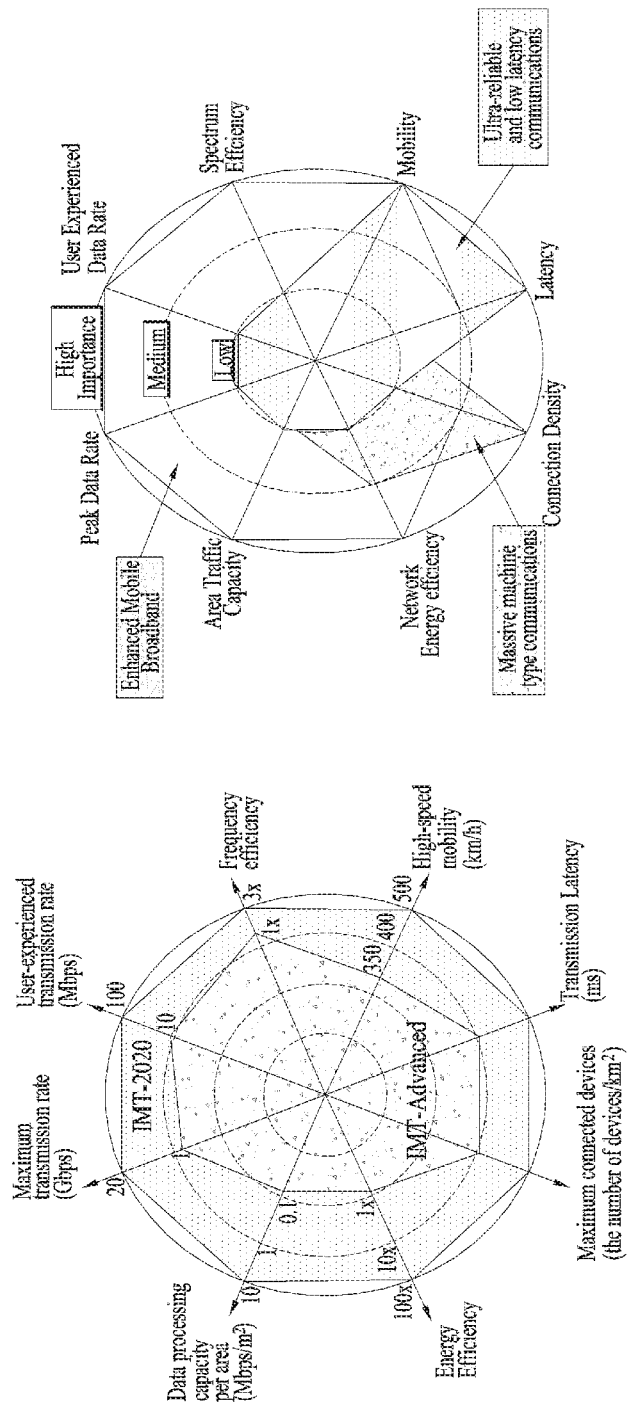
FIG. 1 illustrates a 5G service scenario and performance requirements thereof.
Figure 2:
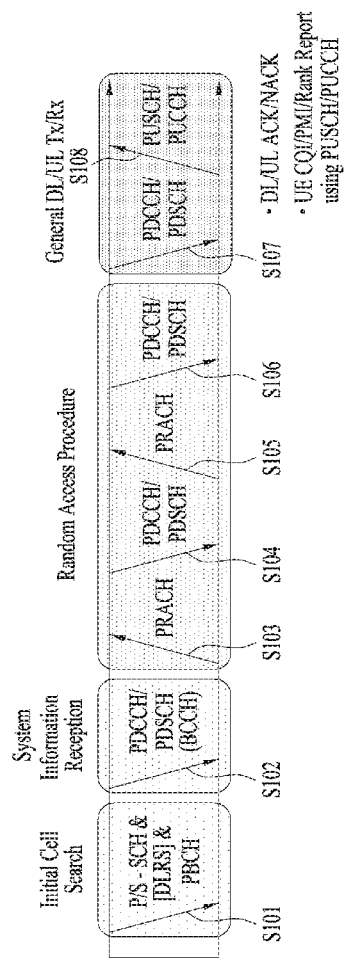
FIG. 2 illustrates physical channels used in the 3GPP LTE/LTE-A system and a general signal transmission method using the same.

FIG. 2 is a diagram for explaining an example of physical channels used for 3GPP LTE/LTE-A system and a general signal transmission method using the same.

Referring to FIG. 2, if a power of a user equipment is turned on or the user equipment enters a new cell, the user equipment may perform an initial cell search job for matching synchronization with a base station and the like [S101]. To this end, the user equipment may receive a primary synchronization channel (P-SCH) and a secondary synchronization channel (S-SCH) from the eNB, may match synchronization with the eNB and may then obtain information such as a cell ID and the like. Subsequently, the user equipment may receive a physical broadcast channel (PBCH) from the eNB and may be then able to obtain intra-cell broadcast information. Meanwhile, the user equipment may receive a downlink reference signal (DL RS) and may be then able to check a DL channel state.

Having completed the initial cell search, the user equipment may receive a physical downlink control channel (PDCCH) and a physical downlink shared control channel (PDSCH) according to the physical downlink control channel (PDCCH) and may be then able to obtain a detailed system information [S102].

Meanwhile, the user equipment may be able to perform a random access procedure to complete the access to the eNB [S103 to S106]. To this end, the user equipment may transmit a preamble via a physical random access channel (PRACH) [S103] and may be then able to receive a response message via PDCCH and a corresponding PDSCH in response to the preamble [S104]. In case of a contention based random access, it may be able to perform a contention resolution procedure such as a transmission [S105] of an additional physical random access channel and a channel reception [S106] of a physical downlink control channel and a corresponding physical downlink shared channel.

Having performed the above mentioned procedures, the user equipment may be able to perform a PDCCH/PDSCH reception [S107] and a PUSCH/PUCCH (physical uplink shared channel/physical uplink control channel) transmission [S108] as a general uplink/downlink signal transmission procedure. Control information transmitted to an eNB by a user equipment may be commonly named uplink control information (hereinafter abbreviated UCI). The UCI may include HARQ-ACK/NACK (Hybrid Automatic Repeat and reQuest Acknowledgement/Negative-ACK), SR (Scheduling Request), CQI (Channel Quality Indication), PMI (Precoding Matrix Indication), RI (Rank Indication) and the like. In the present specification, the HARQ-ACK/NACK is simply called HARQ-ACK or ACK (NACK) (A/N). The HARQ-ACK includes at least one of a positive ACK (simply, ACK), a negative ACK (NACK), DTX, and NACK/DTX. The UCI is normally transmitted via PUCCH by periods. Yet, in case that both control information and traffic data need to be simultaneously transmitted, the UCI may be transmitted on PUSCH. Moreover, the UCI may be non-periodically transmitted in response to a request/indication made by a network.

Hereinafter, a contention-based random access procedure in the LTE system will be described in detail.

(1) Message 1 transmission: A User Equipment (UE) may randomly select one random access preamble from a random access preamble set indicated by system information or a handover command. Thereafter, the UE may select Physical Random Access Channel (PRACH) resources and then transmit the random access preamble using the selected PRACH resources.

(2) Message 2 reception: After transmitting the random access preamble, the UE attempts to receive a random access response within a random access response reception window indicated through the system information or the handover command by an eNB. More specifically, the random access response may be transmitted in the form of a Medium Access Control Protocol Data Unit (MAC PDU), and the MAC PDU may be delivered over a Physical Downlink Shared Channel (PDSCH). To receive information on the PDSCH successfully, the UE needs to monitor a Physical Downlink Control Channel (PDCCH). That is, a PDCCH preferably includes information on a UE to receive the PDSCH, information on time and frequency radio resources of the PDSCH, and information on a transmission format of the PDSCH. Once the UE succeeds in receiving the PDCCH destined therefor, the UE may successfully receive the random access response over the PDSCH according to information included in the PDCCH. The random access response may include an identifier (ID) of the random access preamble (e.g., a Random Access Preamble ID (RAPID)), an Uplink (UL) grant indicating UL radio resources, a temporary Cell-Radio Network Temporary Identifier (C-RNTI), and a Timing Advance Command (TAC).

(3) Message 3 transmission: Upon receiving a valid random access response, the UE processes information included in the random access response. That is, the UE applies the TAC and stores the temporary C-RNTI. In addition, the UE may store data to be transmitted in response to the received valid random access response in a message 3 buffer. Meanwhile, the UE transmits data (i.e. message 3) to the eNB using the received UL grant. Message 3 should include an ID of the UE. This is because in the contention-based random access procedure, the eNB cannot identify which UE performs the random access procedure but the eNB should identify the UEs to avoid a collision later.

(4) Message 4 reception: After transmitting the data including its ID based on the UL grant included in the random access response, the UE awaits reception of a command for contention resolution from the eNB. That is, the UE attempts to receive a PDCCH to receive a specific message. If the UE receives the PDCCH using its C-RNTI, the UE terminates the random access procedure after determining that the random access procedure has been performed normally.

Figure 3:
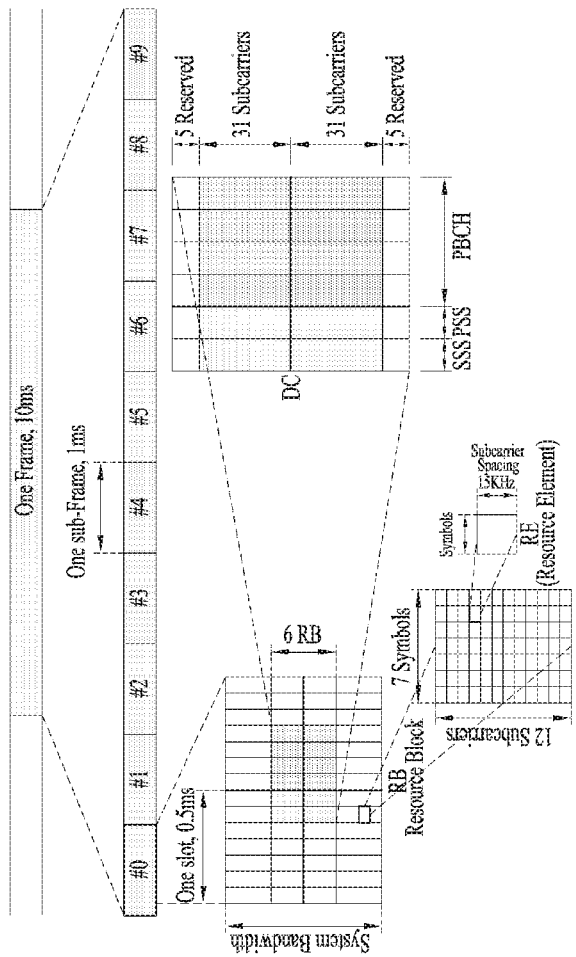
FIG. 3 illustrates the structure of a radio frame of the 3GPP LTE/LTE-A system.

FIG. 3 is a diagram for explaining an example of a structure of a radio frame. Referring to FIG. 3, UL/DL (uplink/downlink) data packet transmission is performed by a unit of subframe in a cellular OFDM radio packet communication system. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

A frame includes 10 subframes. Each of the subframes includes 2 slots in time domain. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDM in downlink, OFDM symbol is provided to indicate one symbol period. The OFDM symbol may be named SC-FDMA symbol or symbol period. Resource block (RB) may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference. When a normal CP is used, since one slot includes 7 OFDM symbols, one subframe includes 14 OFDM symbols. In this case, first maximum 3 OFDM symbols of each subframe may be allocated to PDCCH (physical downlink control channel), while the rest of the OFDM symbols are allocated to PDSCH (physical downlink shared channel). That is, when normal CP is used, 1 RB is defined as 12subcarriers with 15 kHz subcarrier spacing and 7 OFDM symbols.

6 RBs at the center frequency are used to transmit a Primary Synchronization Signal (PSS) and a Secondary Synchronization Signal (SSS), which are used to establish synchronization, and a Physical Broadcast Channel (PBCH) for system information transmission. The above-described frame structure, signals, and channel locations may vary depending on a normal/extended CP, TDD/FDD, etc.

Figure 4:
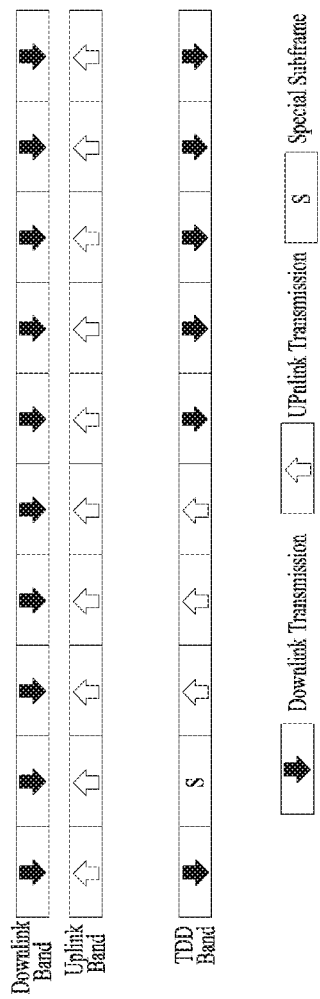
FIG. 4 illustrates Frequency Division Duplex (FDD) and Time Division Duplex (TDD) schemes of the 3GPP LTE/LTE-A system.

FIG. 4 illustrates FDD and TDD in the LTE/LTE-A system. Referring to FIG. 4, in the FDD, different frequency bands are used for DL and UL transmission, respectively. On the other hand, in the TDD, DL and UL regions are separated from each other on a subframe basis in the same frequency band.

Hereinafter, UL multiple access schemes of the LTE system will be described.

First, an SC-FDMA transmission scheme is explained. SC-FDMA may be referred to as Discrete Fourier Transform-spreading-Orthogonal Frequency Divisional Multiple Access (DFT-s-OFDMA). The SC-FDMA is an efficient transmission scheme capable of maintaining Peak-to-Average Power Ratio (PAPR) or a Cube Metric (CM) value at a low level and avoiding a non-linear distortion part of a power amplifier. The PAPR is a parameter representing waveform properties and obtained by dividing the peak value of waveform amplitude by a time-averaged root mean square (RMS) value. The CM is another measurement value representing the PAPR value. The PAPR is associated with a dynamic range which should be supported by a power amplifier at a transmitter. That is, to support transmission with a high PAPR value, the dynamic range (or a linear part) of the power amplifier needs to increase. Since the cost of the power amplifier increases as the dynamic range of the power amplifier increases, a transmission scheme capable of maintaining a low PAPR value is suitable for UL transmission. Accordingly, the current 3GPP LTE system has used the SC-FDMA capable of maintaining low PAPR as a UL transmission scheme.

Figure 5:
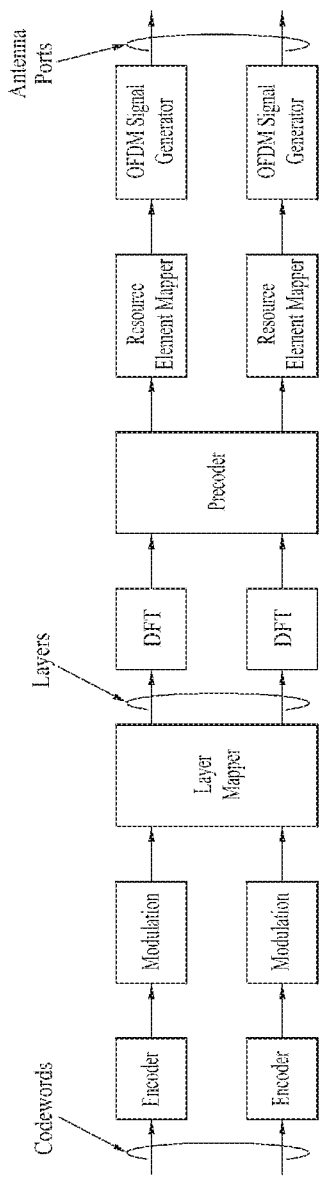
FIG. 5 illustrates an uplink data transmission procedure of the 3GPP LTE/LTE-A system.

FIG. 5 is a block diagram for explaining a DFT-s-OFDMA (or SC-FDMA) scheme for LTE uplink.

One or more codewords encoded by an encoder can be scrambled using a UE-specific scrambling signal. The scrambled codewords are modulated to complex symbols using a BPSK, QPSK, 16 QAM or 64 QAM scheme depending on the type of a transmitted signal and/or a channel state. Thereafter, the modulated complex symbols are mapped to one or more layers.

Although one codeword may be mapped to one layer on a symbol basis, one codeword can be distributedly mapped to up to four layers. If one codeword is distributedly mapped to a plurality of layers, symbols included in each codeword may be sequentially mapped to the layers and then transmitted. In a single-codeword transmission configuration, only one encoder and one modulation block are used.

In addition, transform precoding can be applied to layer-mapped signals. Specifically, Discrete Fourier Transform (DFT) based precoding may be applied to the layer-mapped signals. The layer-mapped signals are multiplied by a pre-determined precoding matrix selected based on the channel state and then allocated to transmission antennas. Thereafter, the per-antenna transmitted signals are mapped to time-frequency resource elements to be used for transmission and then transmitted via the individual antennas after passing through an OFDM signal generator.

New RAT

To satisfy the low-latency requirement among new RAT performance requirements, a new subframe needs to be designed.

[Self-contained Subframe]

Figure 6:
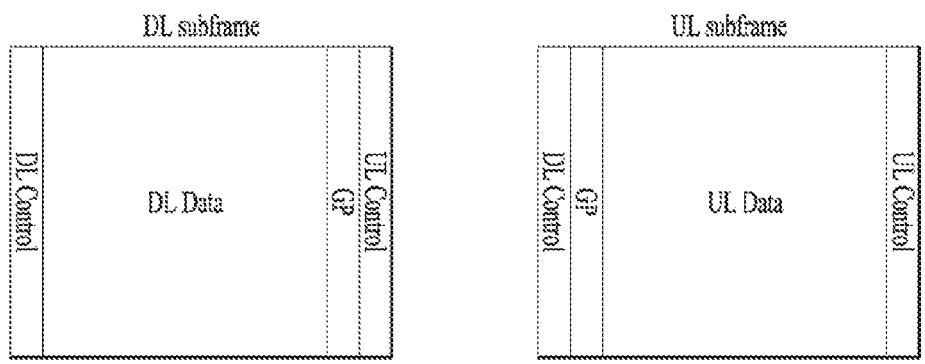
FIG. 6 illustrates the structure of a self-contained subframe according to an embodiment of the present disclosure.

FIG. 6 illustrates a self-contained subframe proposed for the new RAT system. In the following description, the self-contained subframe can be referred to as a subframe for simplicity.

According to a TDD-based self-contained subframe structure, both a resource region for DL and a resource region for UL (e.g., DL and UL control channels) exist in one subframe.

Although FIG. 6 shows the structure of the self-contained subframe where the subframe is composed in the following order: DL control region—data region—UL control region, the present disclosure is not limited thereto. For example, as another self-contained subframe structure, a subframe may be composed in the following order: DL control region—UL control region—data region.

The self-contained subframe can be classified as either a DL self-contained subframe or a UL self-contained subframe depending on the direction of data transmission in the corresponding subframe.

This self-contained subframe structure requires a time gap that allows an eNB and a UE to switch a transmission mode to a reception mode and vice versa. To this end, at least one OFDM symbol on which DL-to-UL switching is performed is set as a guard period (GP) in the self-contained subframe structure. The GP is located at the time when the DL-to-UL switching is performed. For example, in a DL subframe, the GP is located between a DL data region and a UL control region, and in a UL subframe, the GP is located between a DL control region and a UL data region.

Meanwhile, one subframe can be defined to have constant time duration. For example, in the New RAT (NR) system, the time duration of one subframe may be fixed to 1 ms. In this case, since the duration of one symbol is determined by subcarrier spacing, the number of symbols included in one subframe may also be determined by the subcarrier spacing. For example, if subcarrier spacing is 15 kHz, 14 symbols may be included in one subframe. However, if the subcarrier spacing doubles, that is, increases to 30 kHz, the duration of one symbol decreases by half. Thus, a total of 28 symbols may be included in one subframe. Generally, subcarrier spacing of 15 kHz*2 n can be used, and thus a total of 14*2 n symbols can be included in one subframe, where n is an integer such as 0, 1, 2, . . . , but n may not be necessarily a positive integer. For instance, if n is a negative integer, −1, a total of 7 symbols are included in one subframe.

Contention-Based Data Transmission with Control Channel

Compared to contention-free (CF) or grant-based data transmission, contention-based (CB) data transmission has low signaling overhead and low latency. However, when the CB data transmission is applied in an environment where the packet arrival rate (PAR) is high, collision probability may increase. In this case, since retransmission frequently occurs due to the increased collision probability, the CB data transmission may be less efficient than the CF data transmission. Therefore, a transmission method needs to be designed by considering various factors such as a PAR, a packet size, the number of UEs, the size/periodicity of a contention region (zone), etc.

Herein, a multi-access (MA) signature may mean a codebook, a codeword, a sequence, an interleaver, a mapping pattern, etc. In addition, the MA signature may include a reference signal (RS). Moreover, the MA signature may include various information used for identifying multiple users.

According to an embodiment of the present disclosure, a UE may simultaneously transmit a preamble, a control channel, and data during CB data transmission First, the linkage between a preamble and a control channel resource location will be described. The location to which a control channel resource is allocated may be determined as a function of parameters including a preamble index. For example, based on the preamble index, the UE may know whether the control channel resource is located at a position corresponding to the same RB index or at a position corresponding to a different RB index. Information on mapping between the preamble index and control channel resource may be predefined or preconfigured (e.g., through RRC signaling).

Figure 7:
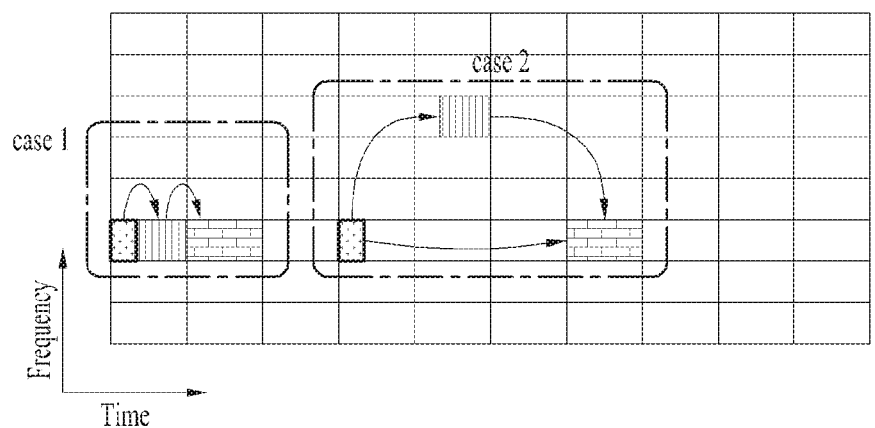
FIG. 7 illustrates that a resource location is indicated by a preamble index.

FIG. 7 illustrates that a resource location is indicated by a preamble index.

As shown in FIG. 7, cases 1 and 2 show different resource mapping rules based on different preamble indices. A CB data transmission location may be indicated by a preamble index or information on the CB data transmission location on a control channel.

Meanwhile, control information transmitted on a UL control channel may contain at least one of a modulation and coding scheme/transport block size (MCS/TBS), a UE ID, information on UE-specific scrambling enabling, and a transmission mode indication for multiple transmission.

(1) MCS/TBS: A control channel may carry information on the MCS and TBS of data that is transmitted after the control channel. Thus, an eNB may detect the data based on the information included in the corresponding control channel. A UE may configure the MCS and TBS according to its channel state to maximize performance. In TDD, the UE may obtain its channel state from a DL RS based on channel reciprocity.

(2) UE ID and UE-specific scrambling enabling: Control information transmitted on a control channel may include a UE ID. Accordingly, a UE may apply UE-specific scrambling to data to be transmitted on a CB data channel, and an eNB may detect a scrambling code used by the UE based on the UE ID and other parameters (e.g., cell ID). The UE-specific scrambling may provide randomization of multi-user interference.

(3) Transmission mode indication for multiple transmission: Control information may include a transmission mode indication. That is, a UE may inform an eNB which transmission mode is used for data transmission.

As an example of the transmission mode, the UE may complete data transmission within one subframe or one CB data unit.

Figure 8:
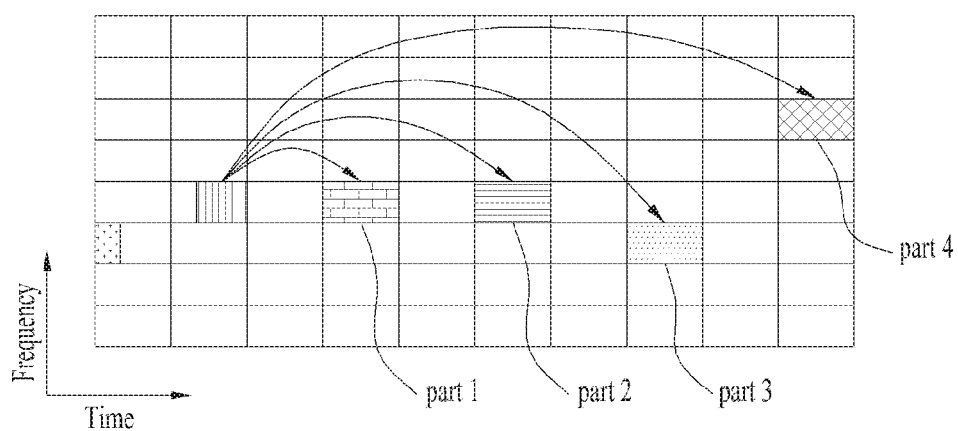
FIG. 8 illustrates a case in which one TB is divided into 4 blocks and then transmitted according to an embodiment of the present disclosure.

As another example of the transmission mode (e.g., partitioning-transmission mode (P-TM)), the UE may transmit one TB over multiple transmission units. FIG. 8 illustrates a case in which one TB is divided into 4 blocks and then transmitted according to an embodiment of the present disclosure. In this case, the eNB should combine the multiple transmission units to perform decoding. That is, when the UE transmits information on its transmission mode to the eNB, the eNB may know how many transmission units are used for one TB and then perform detection.

Figure 9:
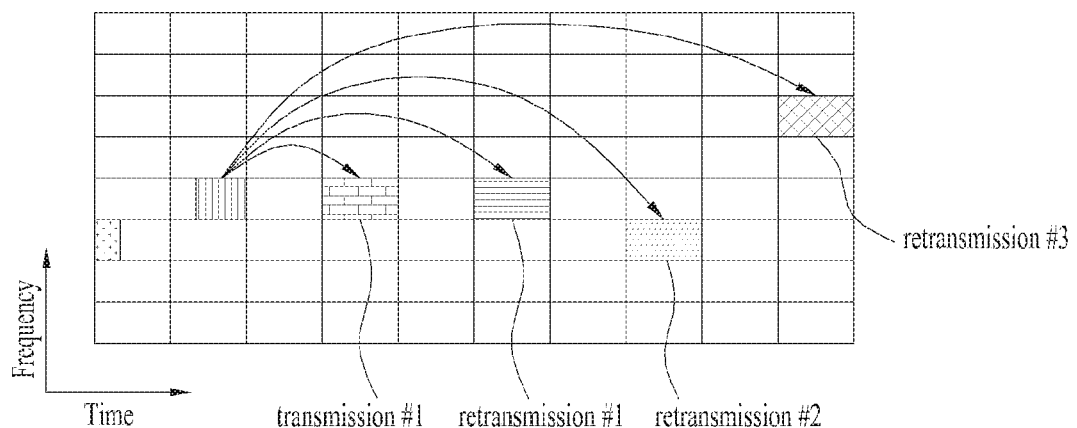
FIG. 9 illustrates an example in which a UE repeatedly transmits data four times.

As still another example of the transmission mode, the UE may transmit data in one CB data unit but repeatedly retransmit the same data (e.g., repetition-transmission mode (R-TM)). A redundancy version (RV) value may be changed every transmission or fixed. Alternatively, an RV pattern may be predefined. In this case, the UE may inform the index of the RV pattern. FIG. 9 illustrates an example in which a UE repeatedly transmits data four times. While repeatedly transmitting the data four times, the UE may repeat a fixed RV value or change an RV value every transmission.

Hereinafter, a description will be given of switching between the P-TM and R-TM.

(i) Determination based on UE measurement: After measuring RSRP, RSRQ, or RSSI based on an RS transmitted from an eNB, a UE may determine, based on the measurement result, whether to transmit data using either the P-TM or R-TM. For example, when the RSRP or RSRQ is equal to or more than a threshold, the UE may configure one large TB, divide the TB (e.g., coded bits) into N sub-blocks, and then transmit the N sub-blocks (P-TM). On the contrary, when the RSRP or RSRQ is less than the threshold, the UE may configure one small TB and then repeatedly transmit the TB (e.g., coded bits) N times (R-TM)

(ii) Mode restriction based on UE capability or power headroom: a UE may determine whether to use either the P-TM or R-TM based on its capability (e.g., power budget). For example, if the UE places a priority on power efficiency, the UE may exclude the use of the P-TM. In addition, if the current power headroom is equal to or more than a specific threshold, the UE may select the P-TM. Otherwise, the UE may transmit data in the R-TM. An eNB may broadcast the power threshold to UEs or configure the power threshold through higher layer signaling (e.g., RRC signaling).

(iii) Mode adaptation based on time window: It is assumed that after transmitting a TB, a UE retransmits the TB in M times. When it said that retransmission is repeated M times, it may mean that N transmission units are retransmitted M times in one region. After repeating the retransmission K times (where K<M), the UE uses only the R-TM. In this case, the value of K may be configured by an eNB. For example, when K=3 and the first transmission is performed in the P-TM, if the UE fails to receive ACK after performing the retransmission three times, the UE uses the R-TM from the fourth retransmission to transmit data. In addition, if the UE receives NACK from the eNB before repeating the retransmission K times, the UE uses the R-TM after receiving the NACK.

(iv) Mode restriction based on N_max: An eNB may configure for a UE the maximum (N_max) of the number (N) of times that the UE is capable of repeating transmission in a CB data region. The configuration of N_max may be transmitted through higher layer signaling (e.g., RRC signaling) or included in system information to be broadcast. Based on the value of N_max, the UE may select either the P-TM or R-TM. For example, if the value of N_max is more than 3, the UE may use the R-TM. On the contrary, if the value of N_max is equal to or less than 3, the UE may use the P-TM.

As a further example of the transmission mode, control information on one control channel may be used for transmission of different TBs. For example, assuming that a UE performs transmission four times to transmit 4 TBs, the UE may transmit a preamble, a control channel and CB data corresponding to TB 1 during the first transmission. Thereafter, the UE may transmit a preamble and CB data (e.g., TB 2/3/4) with no control channel. In this case, the control information (e.g., RV, MCS, TBS, etc.) on the control channel transmitted during the first transmission may be used for TB 2/3/4. In other words, control information on one control channel may be tied to transmission of multiple TBs. According to the present example, not only may control channel overhead be reduced, but also control channels may be managed UE-specifically. By doing so, power/coding gain may be obtained in the time domain, thereby improving performance.

Further, different channel coding may be applied to control and data channels. For example, polar coding may be applied to the control channel, and LDPC may be applied to the data channel.

Additionally, a UE may configure different block error ratios (BLERs) for the control and data channels. That is, the control and data channels may have different error robustness. Specifically, the BLER of the control channel may be set lower than that of the data channel. If an eNB successfully receives the control channel even through the eNB fails to receive the data channel, the eNB may recognize, from a UE ID on the control channel, which UE attempts to transmit data. Accordingly, the eNB may transmit NACK for the data transmitted from the corresponding UE or instruct only the corresponding UE to perform grant-based data transmission.

The above-described examples may be equally applied when preambles are transmitted in a group basis or when a control channel is transmitted in a CB manner. However, in this case, the complexity of blind detection may be increased.

Figure 10:
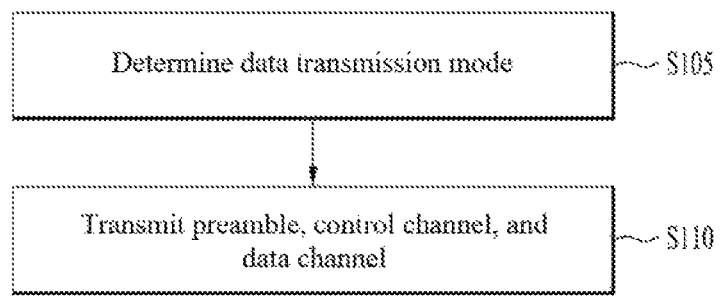
FIG. 10 is a flowchart illustrating a contention-based transmission method according to an embodiment of the present disclosure.

FIG. 10 is a flowchart illustrating a CB transmission method according to an embodiment of the present disclosure. Redundant description will be omitted.

Referring to FIG. 10, a UE determines a data transmission mode (S105). The data transmission mode may correspond to either a first transmission mode where one TB is divided into N sub-blocks and then transmitted or a second transmission mode where the one TB is repeatedly transmitted M times.

The UE transmits to an eNB a control channel carrying control information including the data transmission mode, a data channel carrying at least one TB, and a preamble in a contention resource region (S110).

The preamble may indicate the location of a resource to which the control channel is mapped within the contention resource region When the data transmission mode corresponds to the second transmission mode, the control information may further include an RV pattern for the M-times repeated transmission.

The control information may further include information on the size of each of the at least one TB and a parameter for UE-specific scrambling applied to the at least one TB.

Different channel coding schemes and different BLERs may be applied to the control and data channels.

The UE may determine the data transmission mode based on a result obtained by measuring a reference signal received from the eNB. When the result obtained by measuring the reference signal is equal to or greater than a threshold, the first transmission mode may be selected. When the result obtained by measuring the reference signal is smaller than the threshold, the second transmission mode may be selected.

The UE may determine the data transmission mode based on power headroom. When the power headroom is equal to or greater than a threshold, the first transmission mode may be selected. When the power headroom is smaller than the threshold, the second transmission mode may be selected.

The UE may determine the data transmission mode based on the maximum number of times of transmission allowed in the contention resource region.

Figure 11:
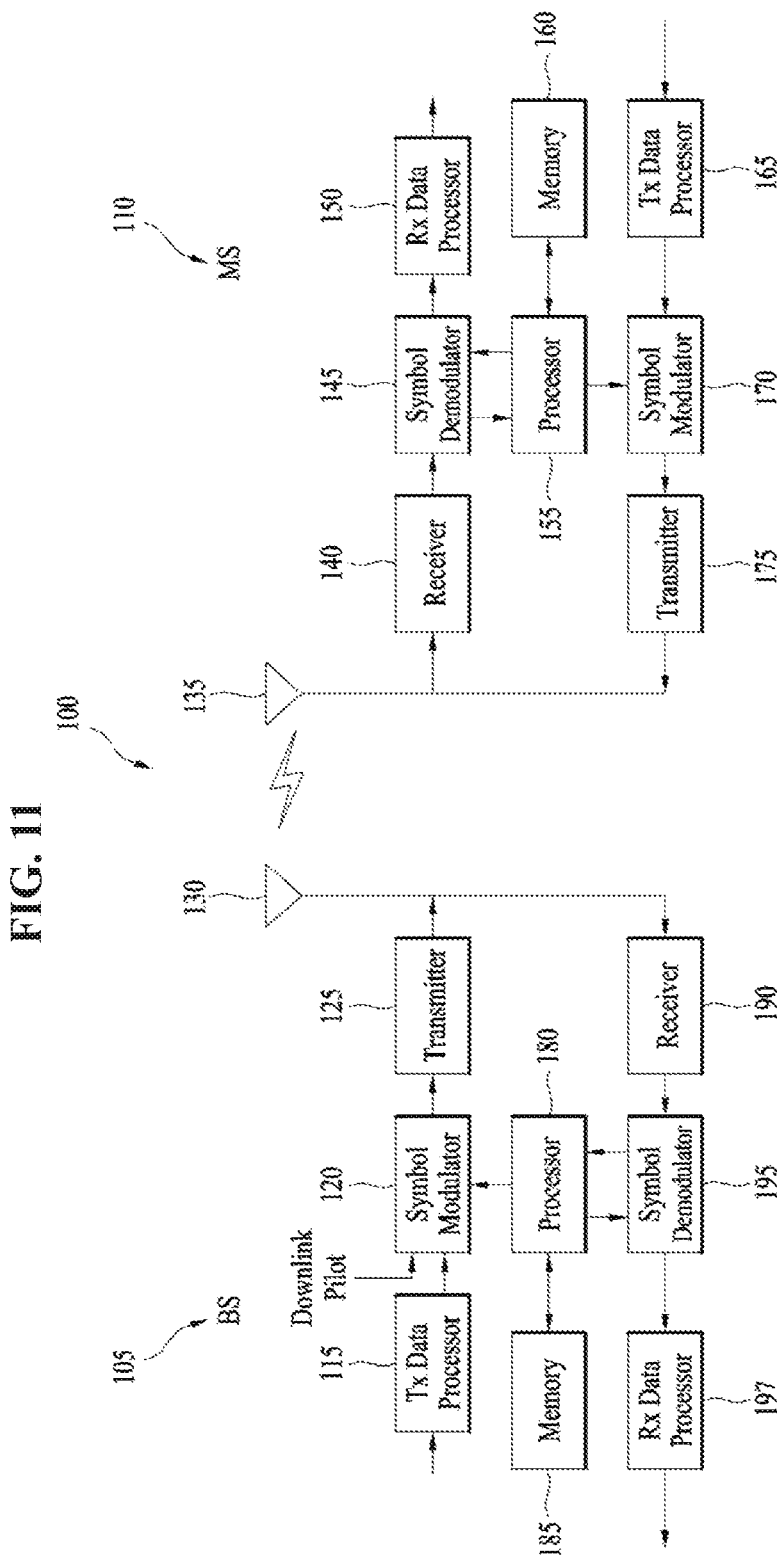
FIG. 11 illustrates a user equipment and a base station according to an embodiment of the present disclosure.

FIG. 11 is a block diagram for configurations of an eNB 105 and a user equipment 110 in a wireless communication system 100.

Although one eNB 105 and one user equipment 110 (D2D user equipment included) are shown in the drawing to schematically represent a wireless communication system 100, the wireless communication system 100 may include at least one eNB and/or at least one user equipment.

Referring to FIG. 11, an eNB 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the eNB/user equipment 105/110 includes one antenna 130/135 in the drawing, each of the eNB 105 and the user equipment 110 includes a plurality of antennas. Therefore, each of the eNB 105 and the user equipment 110 of the present disclosure supports an MIMO (multiple input multiple output) system. And, the eNB 105 according to the present disclosure may support both SU-MIMO (single user-MIMO) and MU-MIMO (multi user-MIMO) systems.

In downlink, the transmission data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the eNB and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmission data processor 115 in the eNB 105, respectively.

In the user equipment 110 in uplink, the transmission data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the eNB 105 via the antenna 135.

In the eNB 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/eNB 110/105 directs operations (e.g., control, adjustment, management, etc.) of the user equipment/eNB 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present disclosure as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present disclosure using firmware or software, the firmware or software may be configured to include modules, procedures, and/or functions for performing the above-explained functions or operations of the present disclosure. And, the firmware or software configured to implement the present disclosure is loaded in the processor 155/180 or saved in the memory 160/185 to be driven by the processor 155/180.

Layers of a radio protocol between a user equipment/eNB and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and an eNB may be able to exchange RRC messages with each other through a wireless communication network and RRC layers.

The above-mentioned embodiments correspond to combinations of elements and features of the present disclosure in prescribed forms. And, it is able to consider that the respective elements or features are selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present disclosure has been described and illustrated herein with reference to the preferred embodiments thereof, it will be apparent to those skilled in the art that various modifications and variations can be made therein without departing from the spirit and scope of the disclosure. Thus, it is intended that the present disclosure covers the modifications and variations of this disclosure that come within the scope of the appended claims and their equivalents.

INDUSTRIAL APPLICABILITY

The embodiments of the present disclosure mentioned in the foregoing description are applicable to various kinds of mobile communication systems.

What is claimed is:

1. A method of transmitting an uplink signal by a user equipment (UE) in a wireless communication system, the method comprising:
   determining a data transmission mode; and
   transmitting, to a base station, a control channel carrying control information including the data transmission mode, a data channel carrying at least one transport block (TB), and a preamble including a preamble index in a contention resource region,
   wherein the preamble index indicates a location of a resource to which the control channel is mapped within the contention resource region, and
   wherein the data transmission mode determined by the UE corresponds to either a first transmission mode where one TB is divided into N sub-blocks and then transmitted using the N sub-blocks using N transmission units or a second transmission mode where the one TB is repeatedly transmitted M times using M transmission units.

2. The method of claim 1, wherein when the data transmission mode corresponds to the second transmission mode, the control information further includes a redundancy version pattern for the M-times repeated transmission.

3. The method of claim 2, wherein the control information further includes information on a size of each of the at least one TB and a parameter for UE-specific scrambling applied to the at least one TB.

4. The method of claim 1, wherein different channel coding schemes and different block error ratios (BLERs) are applied to the control and data channels.

5. The method of claim 1, wherein the UE determines the data transmission mode based on a result obtained by measuring a reference signal received from the base station.

6. The method of claim 5, wherein when the result obtained by measuring the reference signal is equal to or greater than a threshold, the first transmission mode is selected, and wherein when the result obtained by measuring the reference signal is smaller than the threshold, the second transmission mode is selected.

7. The method of claim 1, wherein the UE determines the data transmission mode based on power headroom.

8. The method of claim 7, wherein when the power headroom is equal to or greater than a threshold, the first transmission mode is selected, and wherein when the power headroom is smaller than the threshold, the second transmission mode is selected.

9. The method of claim 1, wherein the UE determines the data transmission mode based on a maximum number of times of transmission allowed in the contention resource region.

10. A user equipment (UE) for transmitting an uplink signal in a wireless communication system, the UE comprising:
a processor configured to determine a data transmission mode; and
a transmitter configured to transmit, to a base station, a control channel carrying control information including the data transmission mode, a data channel carrying at least one transport block (TB), and a preamble including a preamble index in a contention resource region under control of the processor,
wherein the preamble index indicates a location of a resource to which the control channel is mapped within the contention resource region, and
wherein the data transmission mode determined by the UE corresponds to either a first transmission mode where one TB is divided into N sub-blocks and then transmitted using N transmission units or a second transmission mode where the one TB is repeatedly transmitted M times using M transmission units.

11. A method of receiving an uplink signal by a base station in a wireless communication system, the method comprising:
detecting a preamble including a preamble index;
receiving a control channel transmitted by a user equipment (UE) on a resource in a control resource region, wherein the resource is indicated by the preamble index; and
receiving a data channel carrying at least one transport block (TB) based on control information carried by the control channel,
wherein the control information indicates a data transmission mode applied to the data channel carrying the at least one TB, and
wherein the data transmission mode corresponds to either a first transmission mode where one TB is divided into N sub-blocks and then transmitted using N transmission units or a second transmission mode where the one TB is repeatedly transmitted M times using M transmission units.

12. A base station for receiving an uplink signal in a wireless communication system, the base station comprising:
a processor; and
a receiver configured to detect a preamble including a preamble index, receive a control channel transmitted by a user equipment (UE) on a resource in a control resource region, wherein the resource is indicated by the preamble index, and receive a data channel carrying at least one transport block (TB) based on control information carried by the control channel under control of the processor,
wherein the control information indicates a data transmission mode applied to the data channel carrying the at least one TB, and
wherein the data transmission mode corresponds to either a first transmission mode where one TB is divided into N sub-blocks and then transmitted using N transmission units or a second transmission mode where the one TB is repeatedly transmitted M times using M transmission units.

13. The UE according to claim 10, wherein the UE is capable of communicating with at least one of another UE, a UE related to an autonomous driving vehicle, the base station or a network.

* * * * *